Patented May 20, 1941

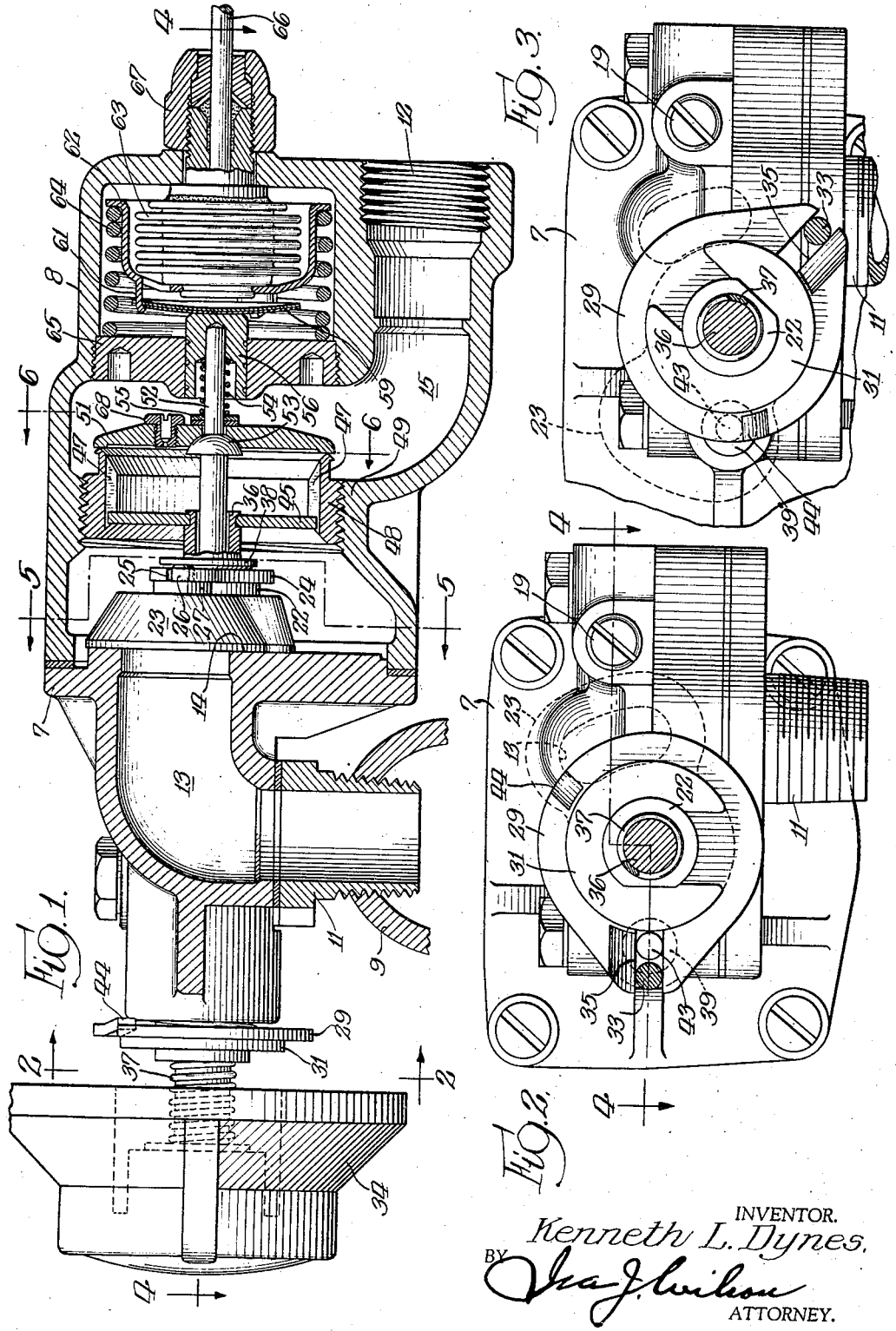

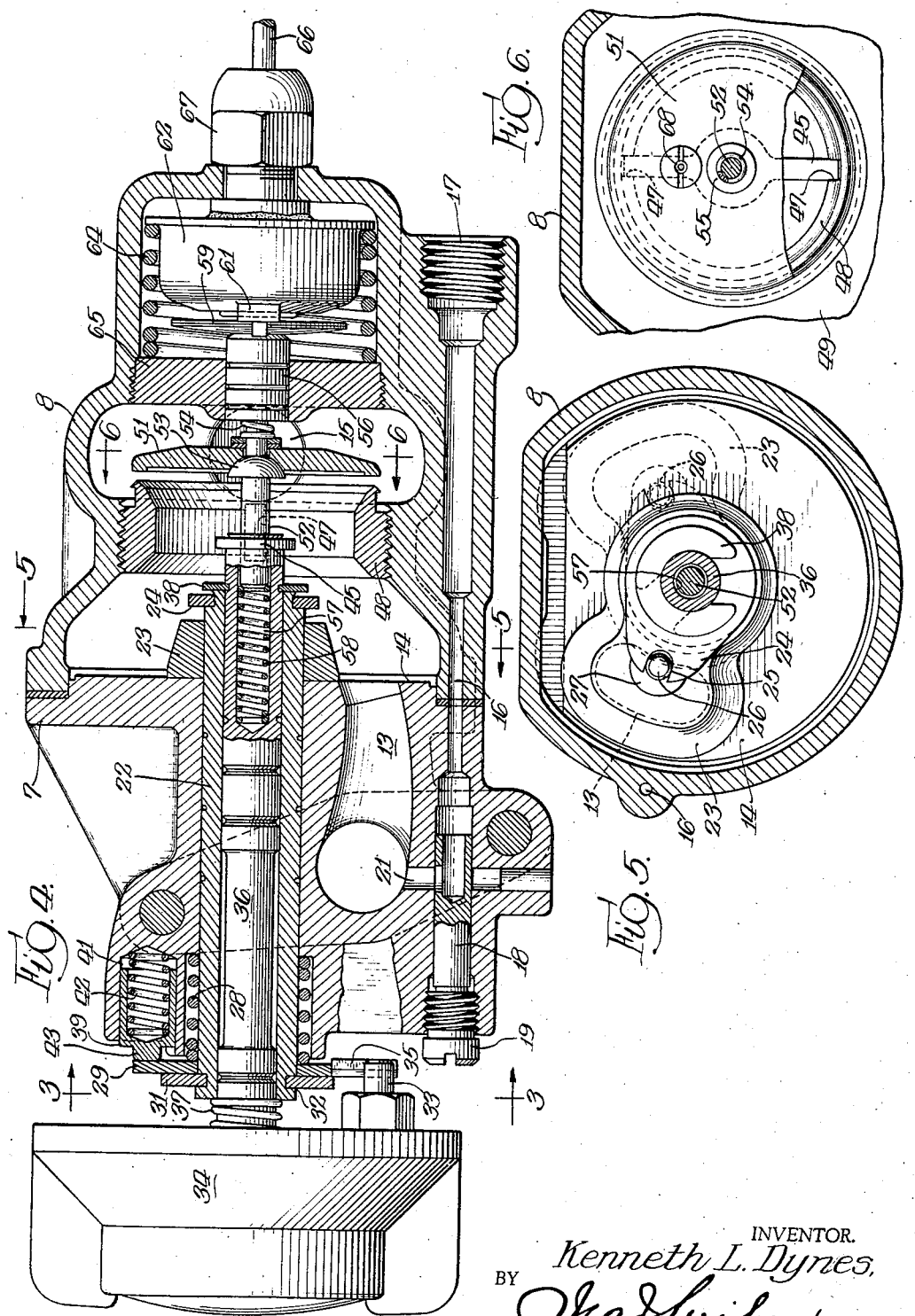

2,242,718

UNITED STATES PATENT OFFICE 2,242,718

FUEL REGULATOR

Kenneth L. Dynes, Lynwood, Calif., assignor to Grayson Heat Control, Ltd., Lynwood, Calif., a corporation of California Application January 21, 1939, Serial No. 252,135

5 Claims. (Cl. 236—99)

This invention relates to means for controlling and regulating the gaseous fuel supply to a burner, and while capable of installation in gas burning appliances of various kinds, the embodiment of the invention herein illustrated is particularly suitable for use as a cooking stove oven regulator.

Manually operable regulators of this general character, by which the fuel is manually turned on and off and the thermostatic control is simultaneously adjusted or set to produce and maintain any predetermined oven temperature, have enjoyed considerable popularity but have been subject to criticism in several respects which my present invention aims to eliminate. One objection to previous regulators is their limited capacity, that is, their ability to deliver gas in sufficient quantity or volume and at the same time maintain the outside dimensions of the casing or housing within desirable limits.

The capacity of such regulators is limited first by the size of the fuel passage therethrough, and, secondly, by the abrupt angular turns in the passage which interfere with the free flow of fuel. My present invention is designed to provide a fuel passage of sufficient size through the regulator to meet the maximum fuel requirements, the passage being also devoid of abrupt turns or angles such as would interfere with and reduce the fuel flow therethrough.

Another feature of my invention resides in its proportions and dimensions which enable it to be directly mounted on and connected with the fuel supply manifold without the employment of laterally disposed elbows and couplings which are commonly necessary. Furthermore, when thus directly connected with the manifold, the control knob will be positioned in alignment with the top burner controls so as to present a neat and uniform appearance, and the top of the regulator casing will be disposed sufficiently low so that the stove front and the burner grids may be maintained at a desirably low level.

In some regulators heretofore used, the manually operable control valve has been disposed outside of, usually at one end of the casing proper, the end wall of which formed the seat with which the valve proper cooperated. This exposure of the valve outside the casing rendered it liable to injury during installation with the result that it would not seat accurately, and gas leakage would occur. My present invention is designed to eliminate this possibility by locating the control valve wholly within the casing where it is adequately protected against injury and also against the liability of the entrance of dirt or other foreign particles between the valve and its seat which would interfere with the required accurate seating fit.

Other objects and advantages of my invention should be appreciated as the same becomes better understood by reference to the following description when considered in connection with the accompanying drawings.

Referring to the drawings:

Fig. 1 is a longitudinal sectional view through a regulator embodying my invention, the control and regulating valves being both shown in closed position;

Fig. 2 is an end view partially in section taken on the line 2—2 of Fig. 1;

Fig. 3 is a similar view showing the position of the parts when the control valve is in fully open position and is taken on the line 3—3 of Fig. 4;

Fig. 4 is a sectional view on the line 4—4 of Figs. 1 and 2 showing the position of the parts when the control and regulating valves are in open position.

Fig. 5 is a sectional view on the line 5—5 of Figs. 1 and 4; and

Fig. 6 is a sectional view on the line 6—6 of Figs. 1 and 6.

Referring to the drawings more in detail, it will be observed that the regulator comprises an elongated casing made for convenience of manufacture in any desired number of sections. In the present instance the two sections shown will be referred to as the front section 7 and the rear section 8. The casing is adapted to be mounted upon and supported by the usual gas supply manifold 9 by means of a spud 11 projecting downwardly from the front casing section and threaded into the manifold, as shown in Fig. 1.

A generally longitudinally extending passage is provided through the casing from the spud 11 to the delivery end 12 of the passage to which a conduit leading to the fuel burner is connected in the usual manner. This passage includes the gently curved portion 13 formed in the section 7 through which the fuel is conducted from the spud, and this portion terminates in a flat-faced valve seat 14 (Fig. 4) surrounding the passage portion where it discharges into the hollow casing section 8. The discharge passage 15, leading to the termination of the outlet 12, is also gently curved, as will be apparent from Fig. 1, to facilitate the flow of fuel therethrough, and, in fact, the whole passage through the casing is devoid of abrupt turns or sharp corners so that the full capacity of the passage may be utilized for the fuel flow which is permitted to progress steadily through the passage without restriction by abrupt turns or by the production of eddy currents.

An auxiliary passage 16 (Fig. 4) extending longitudinally of the casing laterally of the main passage is tapped at its delivery end 17 for connection with a tube leading to the pilot burner and is provided at its opposite end with a plug valve 18 having a kerfed exposed head 19 by which the position of the valve may be adjusted to regulate the fuel flow to the pilot burner from the passage 13 through the branch pilot passage 21.

The casing section 7 is provided with a central, longitudinally extending bore in which is rotatably mounted an elongated sleeve or hollow shaft 22, upon the inner end of which is mounted a flat faced valve 23 projecting radially from the sleeve 22 and machined to snugly but slidably engage the seat 14 against which it is held by an arm 24 rigidly carried by the sleeve 22. The radially projecting end of this arm is bifurcated as indicated at 25 (Figs. 1 and 5) to straddle a pin 26 projecting from the rear face of valve 23 and having a shoulder 27 against which the arm 24 abuts to urge the valve 23 against its seat.

A spring 28 positioned in an annular recess in the casing surrounding the outer portion of sleeve 22 exerts an outward thrust against a disk 29 nonrotatably mounted on the sleeve 22 and held against outward movement relatively to the sleeve by a bifurcated locking disk or washer 31 engaged in a circumferential groove 32 formed in the sleeve 22 near the outer end thereof. The spring 28 continuously urges the sleeve 22 outwardly or to the left viewing Fig. 4, thereby exerting through the arm 24 and shouldered pin 26 a continuous thrust upon valve 23 to yieldingly urge the same against its seat 14. The valve 23 is the control valve of the device by which the flow of fuel through passage 13 may be manually controlled by rotative movements of the sleeve 22.

Sleeve 22 in turn is rotated through the intermediary of the disk 29 fixedly mounted on the sleeve, through the intermediary of a stud 33 projecting rearwardly from an operating knob or handle 34 into a radial slot 35 formed in the disk 29. Rotative movement of the knob manifestly carries the disk 29 with it, thereby rotating sleeve 22 which, through the arm 24 and pin 26, imparts a similar rotative movement to the control valve 23.

Knob 34 is mounted upon the projecting outer end of a shaft 36 extending through sleeve 22, and this shaft is continuously urged outwardly or to the left viewing Figs. 1 and 4 by a coiled expansion spring 37 surrounding the shaft and interposed between the knob and the end of the sleeve 22. Outword movement of the shaft relatively to the sleeve is limited by a radially slotted disk 38 (Figs. 4 and 5) seated in an annular groove formed in the shaft 36 near the inner end thereof. Knob 34 may be manually pressed inwardly against the force of spring 37 for lock releasing purposes, as will be presently explained, but is normally retained by the spring 37 in its projected position, as illustrated in Figs. 1 and 4.

For the purpose of locking the knob and associated parts against rotation when the control valve is in closed position so as to completely shut off the fuel flow through the regulator, a lock pin 39 (Figs. 2, 3 and 4) is slidably disposed in a socket 41 formed in the outer end of casing section 7 and is yieldingly urged outwardly of the socket against the disk 29 by an expansion spring 42. The outer end of the lock pin comprises a stud 43 adapted to enter the slot 35 of disk 29 when the slot is aligned therewith, as shown in Fig. 2, at which time the valve 23 completely closes the passage 13, as indicated in Figs. 1, 2 and 5. The stud 33 extending from the knob 34 into the slot 35 overlies the shoulder of the lock pin 39 surrounding the stud 43, all as shown in Fig. 2.

In this position of the parts, the knob and the parts associated therewith are held against rotation by the lock pin. In order now to release the knob so that it may be rotated to open the control valve, it is only necessary to press the knob inwardly against the force of spring 37 so that stud 33 will push the lock pin inwardly in its socket sufficiently to withdraw stud 43 from slot 35, whereupon the knob may be turned in a clockwise direction from the position shown in Figs. 1 and 2 to that shown in Figs. 3 and 4, thereby swinging the control valve 24 from the full line position to the dotted line position shown in Fig. 5. Rotative movement of the knob in a clockwise direction viewing Figs. 2 and 3 is limited when the parts assume the position shown in Fig. 3 by engagement of a laterally projecting tang 44 on the disk 39 with the stud 43 of the lock pin. In this extreme position, the control valve is in the fully opened position, indicated in dotted lines in Fig. 5. The lock mechanism above briefly described is the invention of Thomas H. Jeffers and constitutes the subject matter of a separate application, Serial No. 253,561, filed January 30, 1939, now Patent No. 2,214,730 granted Sept. 17, 1940.

In addition to rotatably adjusting the control valve, rotation of the knob 34 serves also to adjust the thermostatically controlled regulating valve for the purpose of regulating the oven temperature in the following manner.

Rotation of the knob, of course, rotates the shaft 36 upon which it is fixed, thereby rotating the valve seat drive arm 45 fixed upon and projecting radially from the inner end of shaft 36, as indicated in Figs. 1, 4 and 6. The ends of this drive arm are slidingly engaged in oppositely disposed grooves 47 formed in the inner wall of a hollow valve seat 48 adjustably threaded into a tapped opening provided by a constriction 49 of the casing section 8. Rotation of the shaft 36 imparts a similar rotation to this valve seat with consequent adjustment of the position of this seat longitudinally of the casing. The valve seat threads are left handed so that as the knob is turned in a clockwise direction from off to on position to open the control valve, the seat 48 is retracted or moved to the left viewing Figs. 1 and 4 to correspondingly delay the closing of the regulating valve under the influence of its thermostat, thereby increasing the oven temperature at which the valve will close against this seat.

The regulating valve disk indicated by reference character 51, is loosely mounted upon a stem 52 equipped with a shoulder 53 against which the valve is yieldingly urged by a spring 54 interposed between the valve disk washer 55 and the valve stem head 56. The opposite end of the stem 52 projects into a longitudinal recess 57 in the inner end of shaft 36 and abuts a spring 58 therein which urges the valve disk away from its seat in opposition to the thrust exerted by the thermostat and permits longitudinal movement of shaft 36 for lock releasing purposes even though valve disk 51 be held snugly against its seat by the action of the thermostat.

The end of valve stem head 56 abuts a bi-metallic temperature compensating disk 59 carried by ears 61 struck up from a holder 62 surrounding and carried by the inner end of a thermostatic bellows 63. A loading spring 64 is interposed between a flange on the holder and a sealing plug 65 threaded into the casing whereby the thermostatic element is loaded to prohibit too rapid expansional and contractional fluctuations.

The thermostatic bellows is connected by a capillary tube 66 with a thermostat bulb (not shown) of usual construction positioned within the oven or compartment to be heated. The capillary tube and the thermostatic bellows are retained in assembled relation with the casing by a tail nut 67 in the usual manner.

The valve disk 51 is equipped with a hollow by-pass spud 68 which permits a sufficient flow of fuel therethrough to prevent extinguishment of the burner when the regulating valve is completely closed.

The operation of my improved regulator is substantially as follows: Assuming that the parts are in the position shown in Figs. 1, 2 and 5, control valve 23 completely closes passage 31 shutting off any flow of fuel through the casing, and valve seat 48 is in its extreme position to the right. In order to establish a fuel flow to the burner, the knob 34 is first pressed inwardly to release the latch pin 39, whereupon the knob is turned in a clockwise direction viewing Fig. 2 until cooperative indication marks on the knob and the adjacent mounting panel indicate the desired temperature at which the regulator is to be set. The control valve 23 is now either fully or partially open, depending upon the setting, and the seat 48 has been retracted to the left a commensurate distance corresponding with the setting. Fuel will now flow past the open or partially opened control valve, past the regulating valve disk 51, and to the burner.

As the temperature in the oven approaches that for which the regulator is set, the thermostatic bellows will expand and urge the valve disk 51 toward its seat until when the desired temperature in the oven has been reached, this valve will be completely seated, thereby shutting off the gas flow except for the small quantity passing the by-pass spud, which prevents extinguishment of the burner. Local temperature variations which might detract from the accuracy of the temperature desired to be maintained are compensated for by the bi-metallic compensator 59. A higher temperature setting attained by turning the knob further to the right will correspondingly retract the regulating valve seat and delay the closing of the valve disk thereagainst until further expansion of the thermostatic bellows occasioned by increased temperature in the oven.

In a regulator constructed in accordance with my invention, the operating parts, including the control valve, are all mounted within and protected against injury by the casing, the fuel passage through the casing is relatively unobstructed and free from sharp bends and corners, the proportions and dimensions of the device are such as to comply with the requirements of modern stove builders. The device may be economically manufactured and easily assembled, and is efficient, durable and reliable in operation.

The structural details illustrated and described may obviously be varied within considerable limits without departing from the essence of the invention as defined in the following claims.

I claim:

1. In a fuel regulator, the combination of an elongated casing having a fuel passage therethrough devoid of abrupt angles, a flat seat interiorly of the casing surrounding a portion of said passage, a slidable valve movable across said seat to open and close said passage, a sleeve extending longitudinally of the casing upon the inner end of which said valve is loosely mounted, an arm projecting radially from said sleeve and connected with said valve to operate the same, a thermostatic regulating valve for regulating the flow of fuel passed by said control valve, said regulating valve including an adjustable seat, a shaft extending through said sleeve and connected to adjust the position of said adjustable seat, a knob fixedly mounted on the outer end of said shaft, a spring near the outer end of said sleeve acting through said sleeve and arm to urge said control valve against said flat seat, a spring interposed between said knob and the outer end of said sleeve, said shaft being longitudinally movable within the sleeve by said knob, and means for locking said shaft and sleeve against rotation, said means being releasable upon longitudinal movement of the shaft relatively to the sleeve and means for rotating said sleeve with said shaft.

2. A regulator valve comprising a casing having a passage therethrough, a portion of which passage is substantially straight, said portion having a part of relatively small cross-section and a part of relatively large cross-section, the part of relatively small cross-section terminating at the part of relatively large cross-section in a flat valve seat, a manually controlled flat valve pivoted in the part of relatively large cross-section and eccentrically of said part of small cross-section and adapted to slide across said valve seat to open and close the passage therethrough, a thermostatically controlled valve in a bend at the end of said straight portion and adapted to withdraw from its seat in the direction of fluid flow, whereby passage through said portion is substantially unobstructed by said valves when said valves are open.

3. A regulator valve comprising a casing having a passage therethrough, a portion of which passage is substantially straight, said straight portion having a part of relatively small cross-section and a part of relatively large cross-section, the part of relatively small cross-section terminating at the part of relatively large cross-section in a flat valve seat, a manually controlled flat valve pivoted in the part of relatively large cross-section and eccentrically of said part of small cross-section and adapted to slide across said valve seat to open and close the passage therethrough, a thermostatically controlled valve having an adjustable seat, said valve being located in a bend at the end of said straight portion and adapted to withdraw from its seat in the direction of fluid flow, whereby passage through said portion is substantially unobstructed by said valves when said valves are open.

4. A regulator valve comprising a casing having a passage therethrough, a portion of which passage is substantially straight, said portion having a part of relatively small cross-section and a part of relatively large cross-section, the part of relatively small cross-section terminating at the part of relatively large cross-section in a flat valve seat, a manually controlled flat valve pivoted in the part of relatively large cross-section and eccentrically of said part of small cross-section and adapted to slide across said valve seat to open and close the passage therethrough, a thermostatically controlled valve having an adjustable seat, said valve being located in a bend at the end of said straight portion and adapted to withdraw from its seat in the direction of fluid flow, a knob, and means for operating both of said valves simultaneously by the rotation of said knob.

5. A regulator valve comprising a casing having a passage therethrough, a portion of which passage is substantially straight, said portion having a part of relatively small cross-section and a part of relatively large cross-section, the part of relatively small cross-section terminating at the part of relatively large cross-section in a flat valve seat, a manually controlled flat valve pivoted in the part of relatively large cross-section and eccentrically of said part of small cross-section and adapted to slide across said valve seat to open and close the passage therethrough, a thermostatically controlled valve having an adjustable seat, said valve being located in a bend at the end of said straight portion and adapted to withdraw from its seat in the direction of fluid flow, a shaft adapted to operate said adjustable seat, a sleeve surrounding said shaft and adapted to operate said manually controlled valve, and a knob adapted to simultaneously rotate said shaft and said sleeve.

KENNETH L. DYNES.